United States Patent [19]

Levy et al.

[11] Patent Number: 4,838,947

[45] Date of Patent: Jun. 13, 1989

[54] SPUN-WOVEN ABSORBENT PAD CONTAINING CORN COB GRANULES FOR APPLICATION IN REMOVAL OF COOKING OILS FROM VESSEL

[76] Inventors: Marvin H. Levy, 12432 Merrick Dr., St. Louis, Mo. 63146; Robert S. Steinfort, R.R. 3, Lincoln, Ill. 62656

[21] Appl. No.: 109,209

[22] Filed: Oct. 16, 1987

[51] Int. Cl.$^4$ ............................................. B01D 15/00
[52] U.S. Cl. ....................................... 134/7; 210/282
[58] Field of Search .............. 134/6, 7; 210/680, 693, 210/282, 484, 924

[56] References Cited

U.S. PATENT DOCUMENTS 4,497,712  2/1985  Cowling .............................. 210/282
4,659,478  4/1987  Stapelfeld et al. ..................... 134/7

Primary Examiner—Ivars Cintins
Attorney, Agent, or Firm—Paul M. Denk

[57] ABSTRACT

A cooking oil absorbing hand size pad or package useful particularly for picking up oil from a cooking vessel, or the like, formed of a spun or woven fabric material, such as woven from cotton fibers, or polymer strands, such as a polyester, or of a spun polymer, and folded over upon itself or laminated together to form the contemplated package, and having a quantity of fluids absorbing fibrous organic granular material packaged therein, in sufficient bulk, to provide absorption of ample quantities of heated oils, or other fluids, during application and usage of the package.

1 Claim, 1 Drawing Sheet

SPUN-WOVEN ABSORBENT PAD CONTAINING CORN COB GRANULES FOR APPLICATION IN REMOVAL OF COOKING OILS FROM VESSEL

Background of the Invention

The application of absorbent materials, generally located around machinery, equipment, and the like, and frequently formed of granular type of material, has long been available in the prior art. As an example, U.S. Pat. No. 4,659,478, discloses a fluid absorbing method, wherein an oil absorbing member including an elongate tubular device or sock, filled with highly absorbent particulate material of a capillary nature, generally formed of absorbing particles preferably comprising ground core, of the corn cob, or otherwise know as its "pith", is used around machinery tool base for eliminating or reducing the presence of oil, or liquids, or the like. This patent disclosure, to applicant's knowledge, is the most pertinent prior art in existence relating to the subject matter of this current invention.

Corn cob products, generally formed of cob flour, or beeswing, has been previously used in fabric type bags, of the tubular form, as shown in the previously identified patent, and for use around machinery, as in a machine shop, or in a print shop, around printing machinery, for use for absorbing spills, oil leaks, or the like, generally present around the base of such type equipment. Frequently, corn cob products of granular material have been used in bulk form, for scattering around equipment, or upon floors, for functioning as an absorbent of oil, or the like, where a spill or a leak has occurred. The current invention, as distinct from these foregoing applications, forms a hand size pad that contains related type of absorbent materials, generally formed of separate components of corn cob granules, for application for a very specific purpose, and that is for household or related usage, for cleansing oil and other deleterious particles from pans, to remove excess cooking oil, or the like, following a culinary or other heating session.

Other United States patents revealing various oil or liquid absorbing means are shown in the patent to Horowitz, U.S. Pat. Nos. 3,494,862; the patent to Vander Hooven, 3,617,564; the patent to Oshima, 3,617,566; United States patent to Bogosian, 3,739,913; and the United States patent to Golding, 4,366,067. Most of these devices relate to means for absorbing oil, as spilled either upon water, such as the seas, or other hard surfaces, and which, in some instances, contain a cylindrical bag, knitted of polyethlyene or polypropylene threads, or monofilaments, as shown in the Oshima patent. And, the use of ground or low-density corn cob meal for application to a polluting oil deposit in a body of water or land area is disclosed in the Vander Hooven patent. But, the combination of these two types of components together, and specifically having the ground granules of corn cob encapsulated within a spun type fibrous fabric material, which in and of itself is highly absorbent, and for application specifically for cleaning cooking oil from vessels, is not believed to have been given consideration by any prior art development.

Other United States patents relating to the subject matter of this invention, and proposed for floatation as a means for absorbing and for confining oil, or the like, are shown in the U.S. Pat. Nos. 3,739,913; 3,617,565,; 3,617,566; 3,598,729; 3,791,990.

SUMMARY OF THE INVENTION

This invention relates generally to absorbent means, and more specifically pertains to the fabrication and application of an absorbent pad, particularly for use for dispensing of cooking oils, left over from a culinary or other heating session, and comprises the combination of a quantity of bulk granular fibrous organic absorbent material, and more particularly ground corn cob granules, enveloped within a fabric member pouch, all of which components are readily absorbent to the oil and provide for its substantial removal and elimination from the vessel in which it is contained.

As is well know, the corn cob is generally formed of a variety of components, all of organic matter, naturally occurring, with the fine outer soft layer, from which the kernel is removed, comprising that which is identified as the soft beeswing, and then having internally thereof a hard middle woody ring segment, and finally the soft center pith that forms the internal aspects of the corn cob during its growth. Grinding of these components, and more particular the soft beeswing and center pith portions, into a granular consistency, provides a quantity of absorbent material that readily accepts and absorbs various fluids, and particularly oils, of the type intended to be removed through the application of this invention. Generally, these components as used in this invention are initially reduced in a hammer mill, subjected to air separation, exposed to fine grinding, and then screened, all of which is intended to provide a fine grit or particulate matter, highly absorbent, with substantially all dust and other deleterious fines removed. Scientifically, it has been found most effective to reduce the granules to a fine consistency obtained through filtering of the prepared granules within a mesh of U.S. Standard No. 4, or of lesser mesh, in order to provide that composition of cob granules that are most absorbent of fluids of the viscocity of oil. While utilizing a mesh filtering screen of that dimension, or finer, may be the most effective, obviously, in certain instances, mesh of lesser number screening may be appropriate under the circumstances. The desired screen size is the No. 20.

It is within the concept of this invention to use a packaging of the aforesaid type of granular material within a pad, one which is formed of a woven or spun strand material, and which, in and of itself, because of its porous consistency is also readily absorbent to the oils disposed for removal, upon its immediate contact with the same. Fabrics useful for this purpose may be fabricated from woven cotton fibers, or an organic form of fabric, or they can likewise be fabricated from any of the available polymers, as a non-woven or spun form of fabric, such as a polyester. This type of woven fabric in the trade is identified as a spun polyester fabric, for forming a package useful for enveloping the granular materials as identified, and which in combination with the granular materials improves both the speed of absorption and the retention of the oil because of its unique construction of spun-bonded polyester in the case of the polymer formed package, and likewise due to the natural absorbency of cotton fibers, when woven into a fabric form, for use in the fabrication and assembly of a package of this design. Obviously, polymer strands woven into a fabric also can be utilized. The spun form of fabrics, made from polymer, is generally, though, identified as the non-woven form of fabric. On the other hand, forming such a fabric from other processed polymer strands, such as through thermal bonding or resin bonding, may function just as effectively.

The package considered for holding the granular material of this invention is generaly formed into a small hand size packet, generally fabricated of a singular piece of woven fabric material, and which is turned over along one edge and sealed along its other, into the tubular form. The granular material is located therein, in the amount and quantity as found necessary to provide sufficient absorbency for the device. Then, the opposite end edges of the packet are sealed, to provide a complete encapsulation of the absorbent granular material therein. In practice, it has been found that forming a packet of approximately five inches in length, approximately four inches in width, and approxiamtely one-half to one inch in thickness, depending upon the bulk of the granular material located within the packet, during its formation, has been determined satisfactory for the removal of most oils from the variety of cooking vessels as previously reviewed in this disclosure. The quantity of cob granules deposited into a pocket of this size is generally around two to four ounces. Obviously, other sizes will work just as effectively for the intended purposes.

The application of the packages of this invention by the homemaker, or at commercial establishments, after a cooking session, is readily useful for absorbency and removal of cooking oils from the variety of hibachis, tempura pots, frying pans, and the like, particularly when greasy and oily foods have been prepared, such as bacon, fish, and the like. Obviously the packages can be made in various sizes, in order to accommodate and be used in conjunction with cooking vessels of varying sizes. Likewise, it is likely that the packages of this invention, formed in accordance with the terms of this development, may also have some industrial applications, be readily available for use by the researcher, or the like, for cleaning any employed vessel or pan that needs ready removal of any heated oils, or other fluids, during or after an experiment, or performance of an industrial operation. The significant element is that these pads, once used, can be disposed of immediately.

In particular, since the pads of this invention are for general use in combination with heated oils, or the like, temperature conditions also dictate the heat resistant parameters for the package forming fibers and fabric. In the case of a cotton fabric, used in conjunction with the formation of the package of this invention, generally cotton will readily absorb heated fluids such as hot oils, or the like. And, this is achieved without a burn through of the fabric. In the case of polymers, it is necessary that a polymer be used, such as a polyester, that can withstand temperature conditions in the range of up to approximtely two hundred ten to two hundred thirty degrees. More specifically, in the formation of the spun fiber form package of this invention, a polyester yarn having a specific gravity of approximately 1.38, and which can withstand temperttures up to approximately 500° F., are quite resistant to temperatures up to that operating range. Heated cooking oils may have temperature conditions up to approximtely 200° F. or more, after processing during a cooking session. In addition, forming a polyester style of package from fabric of that type is very resistant to aging, is generally insect proof, and quite resistant to other fluids to which they may be exposed, such as acids, hydrides, ketones, and benzene, just in cas the packages are exposed to industrial processes incorporating these type of chemicals.

In any event, during usage, it is contemplated that the homemaker, or the researcher, may simply locate one of the pads of this invention into the vessel to be immediately cleaned, and to have its heated oils or chemicals absorbed, and this can be done simply through the use of tongs, or other hand holding means, for swabbing of the pad or package about the vessel, until the fluids are totally absorbed, at which the time the package then can be immediately removed and discarded, having fulfilled its purpose.

It is, therefore, in view of the foregoing, a principal object of this invention to provide a cooking oil absorbing hand size pad or package containing a quantity of fibrous organic absorbent material, in granular form, for removal oils and other fluids from vessels, and having disposable characteristics.

Another object of this invention is to provide a convenient sized package, generally applicable for singular usage, for removal of oils or other unwanted fluids from a heated vessel, or the like.

Still another object of this invention is to provide a fluids and oil absorbing package which contains a bulk quantity of specifically prepared granular corn cob to achieve rapid absorption of oils.

Another object of this invention is to form a package for holding granular absorbent material, and which package itself is fabricated of absorbent fibers, whether it be of the natural vegetable type, as formed of cotton fibers, or of a polymer type of spun or woven fabric, such as formed of a polyester.

These and other objects will become more apparent to those skilled in the art upon reviewing the description of the preferred embodiment herein, in view of the drawing.

BRIEF DESCRIPTION OF THE DRAWINGS

In referring to the drawing, FIG. 1 provides an isometric view of the absorbent package of this invention.

Description of the Preferred Embodiment

Figure 1:
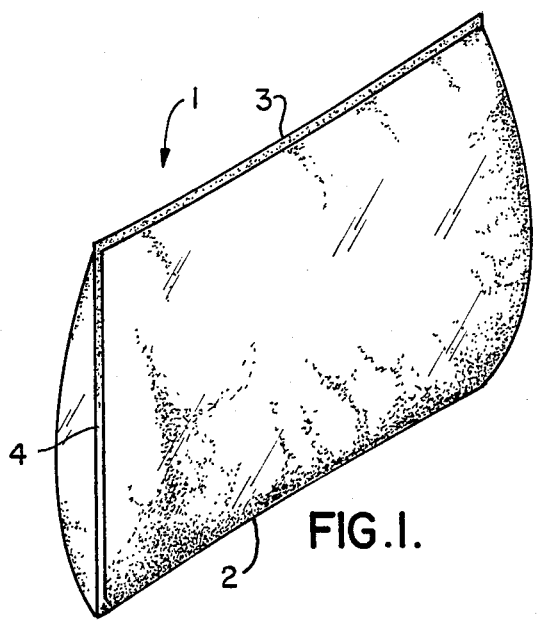
Figure 2:
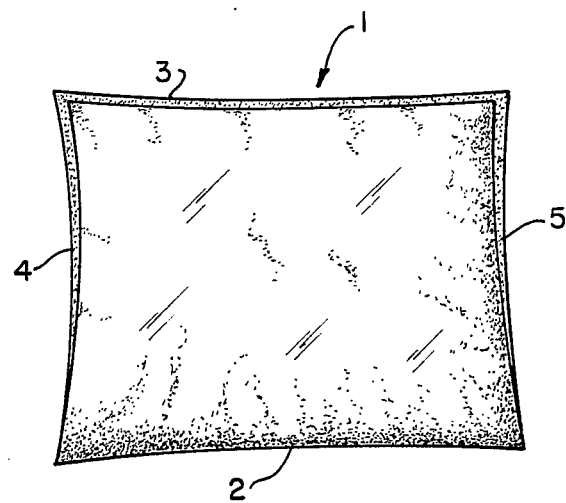
FIG. 2 provides a front view thereof.
Figure 3:
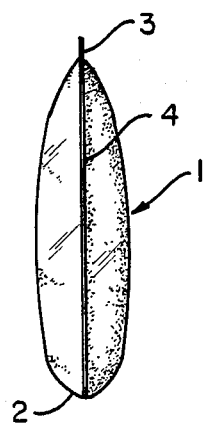
FIG. 3 provides one end view thereof.
Figure 4:
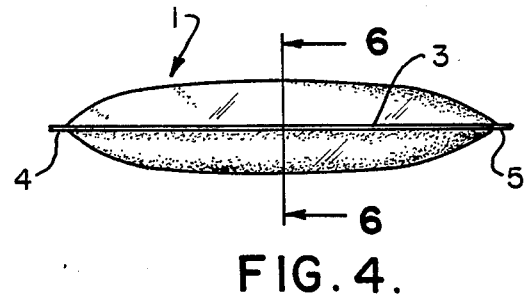
FIG. 4 is a top edge view thereof.
Figure 5:
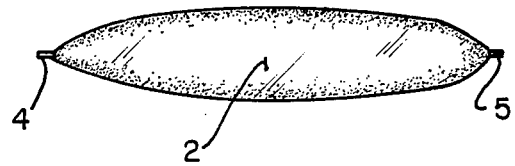
FIG. 5 is a bottom edge view thereof.
Figure 6:
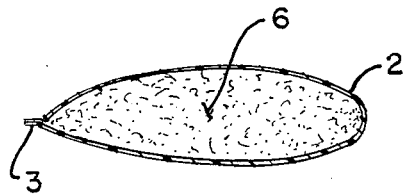
FIG. 6 is a sectional view taken along the line 6—6 of FIG. 4.

In referring to the drawing, FIG. 1 discloses a prototype of the oil absorbing package 1 of this invention. Generally, the package has dimensions, as previously described, which add to the convenience and facility and application of this pad, as a hand held product, and one that can then be easily manipulated through the use of tongs or grippers, when absorbing the heated oils, or the like, from any vessel, during usage and application. The package is formed of a woven or spun fabric material, of the type as previously explained, generally constructed from a singular piece of fabric material, which is folded over, as along the bottom edge 2, and then sealed along its upper edge, as at 3, in order to form a tubular shape for the constructed package. The form of seals that may be utilized herein generally, as shown, are of linear form, and in the case of a cotton fabric, will be stitched in place, whereas, when a polyester or other polymer form of fabric is utilized in the fabrication of this package, it may likewise be stitched or heat sealed along the seams during its construction. Obviously, other forms of seals, such as the curved or of the arcuate form may be used, depending upon the shape of the package. Following this, one end seam, as at 4, may be sealed, and through the other open end a quantity of granular material, of the type as previously explained, is inserted therein, to provide sufficient bulk for the package, to facilitate its hand holding, but likewise, to have adequate capacity for absorbing all of the oils or other fluids that may be contained within a vessel, after its usage, as for example during a cooking process. At this point, the opposite side edge, as at 5, may be sealed into closure, in the manner as previously explained, depending upon the type of fibrous fabric utilized in the formation of the package, in order to provide full closure for the package in preparation for its shipment and usage. As can be noted in FIG. 6, the quantity of granular material is readily observable as at 7, and generally is of the ground corn cob type, having the granular consistency as previously described for formation of the absorbent pad.

While the configuration of the pad as shown herein is generally in the rectangular form, and this is done s because of the ease and facility in which a pad of this shape and design can be fabricated, it is just as likely that the linear seams formed along its edges may be formed more at a curvature, of an arcuate dimension, or even circular in design, in the formation of the finished pad. Thus, a length of seal at those lateral edges for the fabric when folded over upon itself, or when two pieces are laminated together, may be either stitched in place, or heat sealed, after the granular material has been inserted therein, to form a pad of equivalent dimensions, holding a quantity of the granular corn cob material, as previously explained, in order to provide an oil or other fluids absorbing hand size package for use for its intended purposes, as previously reviewed herein. It is just as likely that the fabric package can be woven initially as a one piece tube.

Variations or modifications to the features of this invention may occur to those skilled in the art upon reviewing the subject matter of this disclosure. Such variations or modifications, if within the spirit of this invention, are intended to encompassed within the scope of any claims to patent protection issuing upon this development. The description of the preferred embodiment set forth herein is done so for illustrative purposes only.

Having thus described the invention, what is claimed and desired to be secured by Letters Patent is:

1. A method for picking up oil from a cooking vessel, comprising arranging a piece of fabric formed as a woven or spun cloth from a natural or polymer material, folding said fabric member over into a tubular shape, sealing an upper edge and one end seam of said tubular member, applying a quantity of ground fiberous organic absorbent material comprising ground corn cob into the tubular member before complete sealing, sealing the opposite end seam of the said folded over fabric material, and then applying said absorbing pad to a vessel following a cooking session to absorb and remove a substantial remaining quantity of oil located within the cooking vessel from said cooking vessel.

* * * * *